L. L. KNOX.
WATER COOLED FLOOR.
APPLICATION FILED OCT. 24, 1914.
1,223,800.
Patented Apr. 24, 1917.
4 SHEETS—SHEET 1.
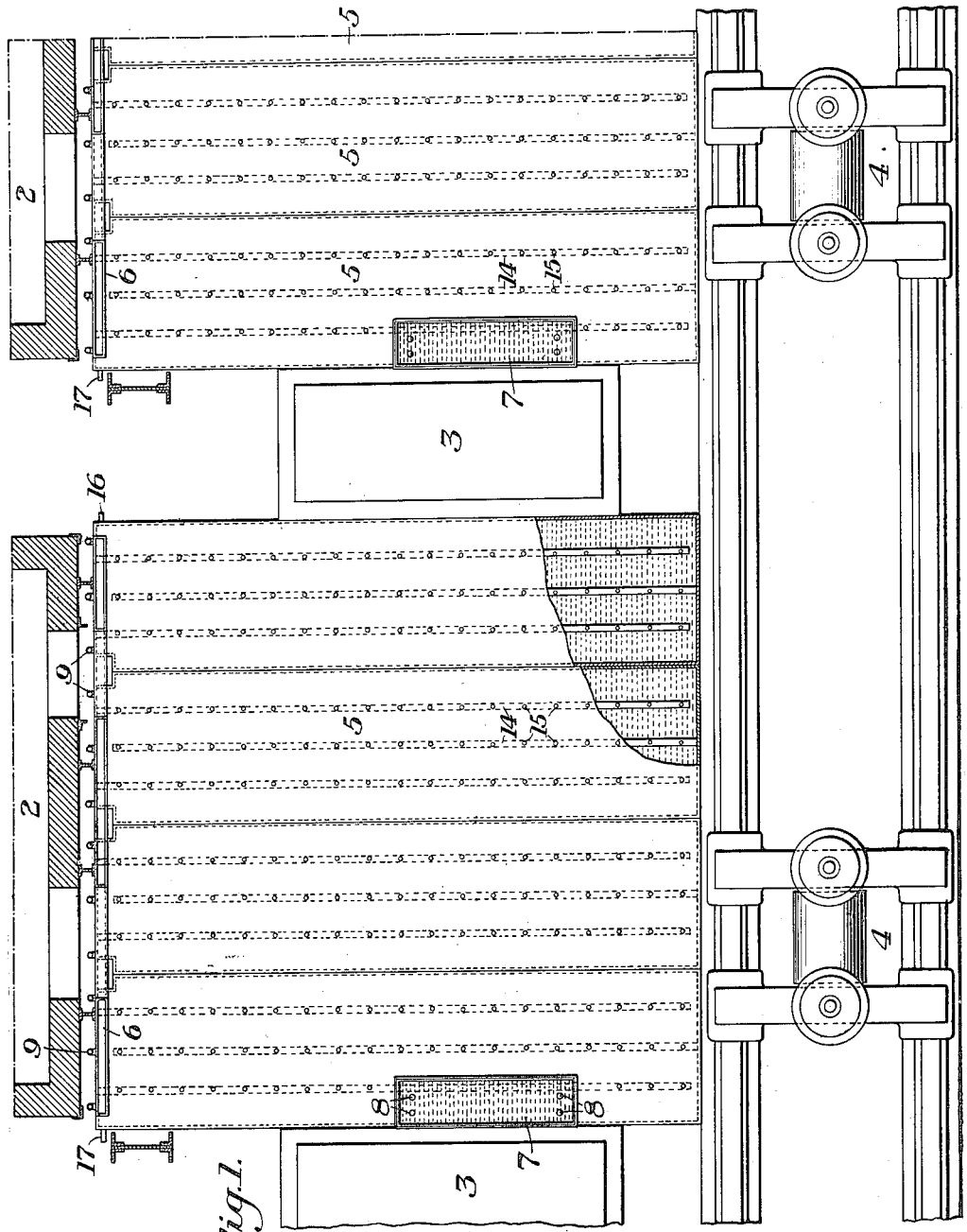
WITNESSES
INVENTOR L. L. KNOX.
WATER COOLED FLOOR.
APPLICATION FILED OCT. 24, 1914.
1,223,800.
Patented Apr. 24, 1917.
4 SHEETS—SHEET 2.
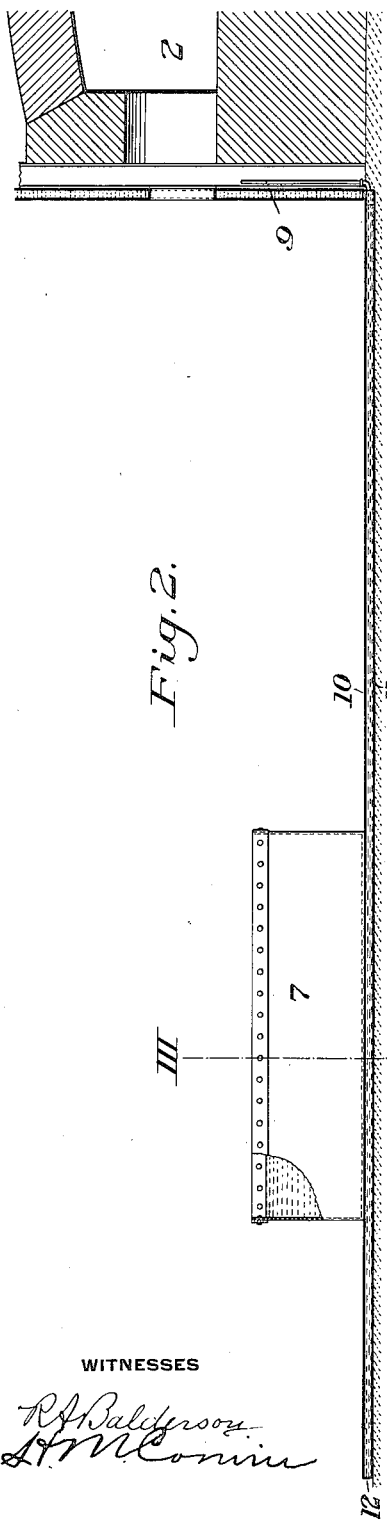
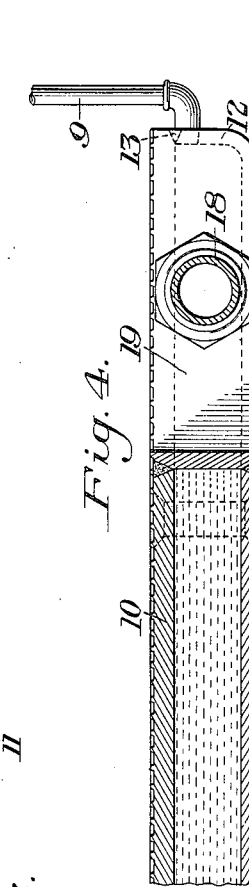
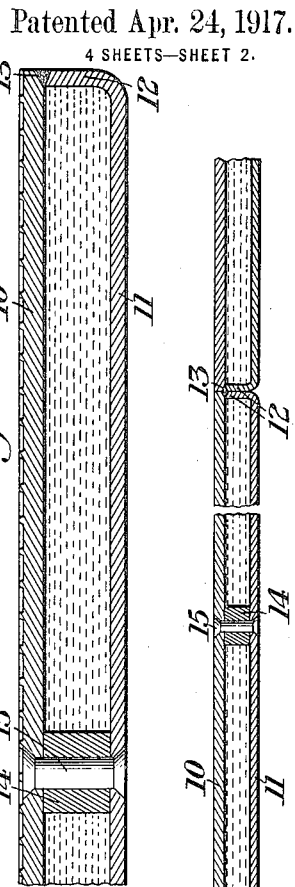
WITNESSES
INVENTOR

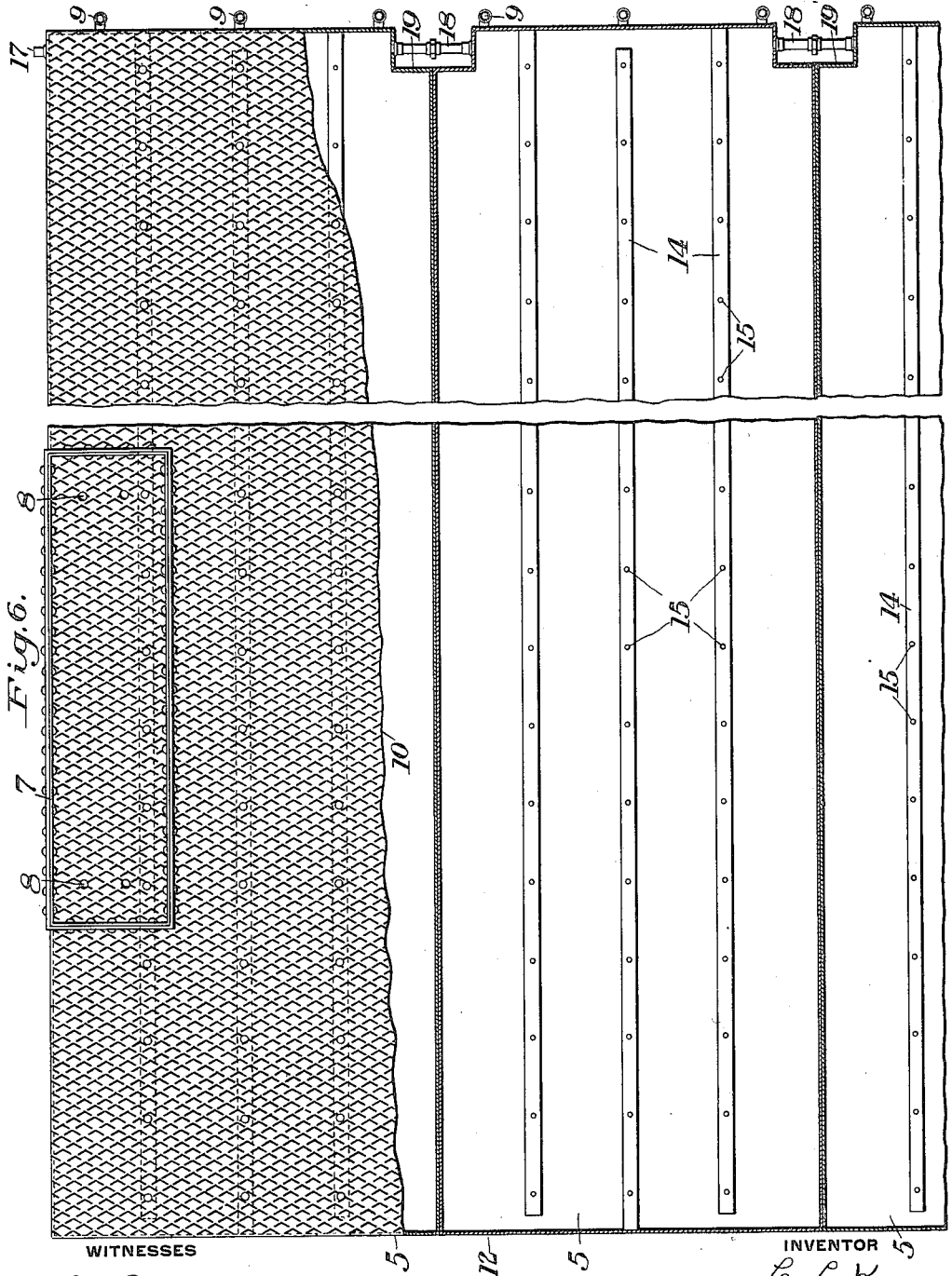

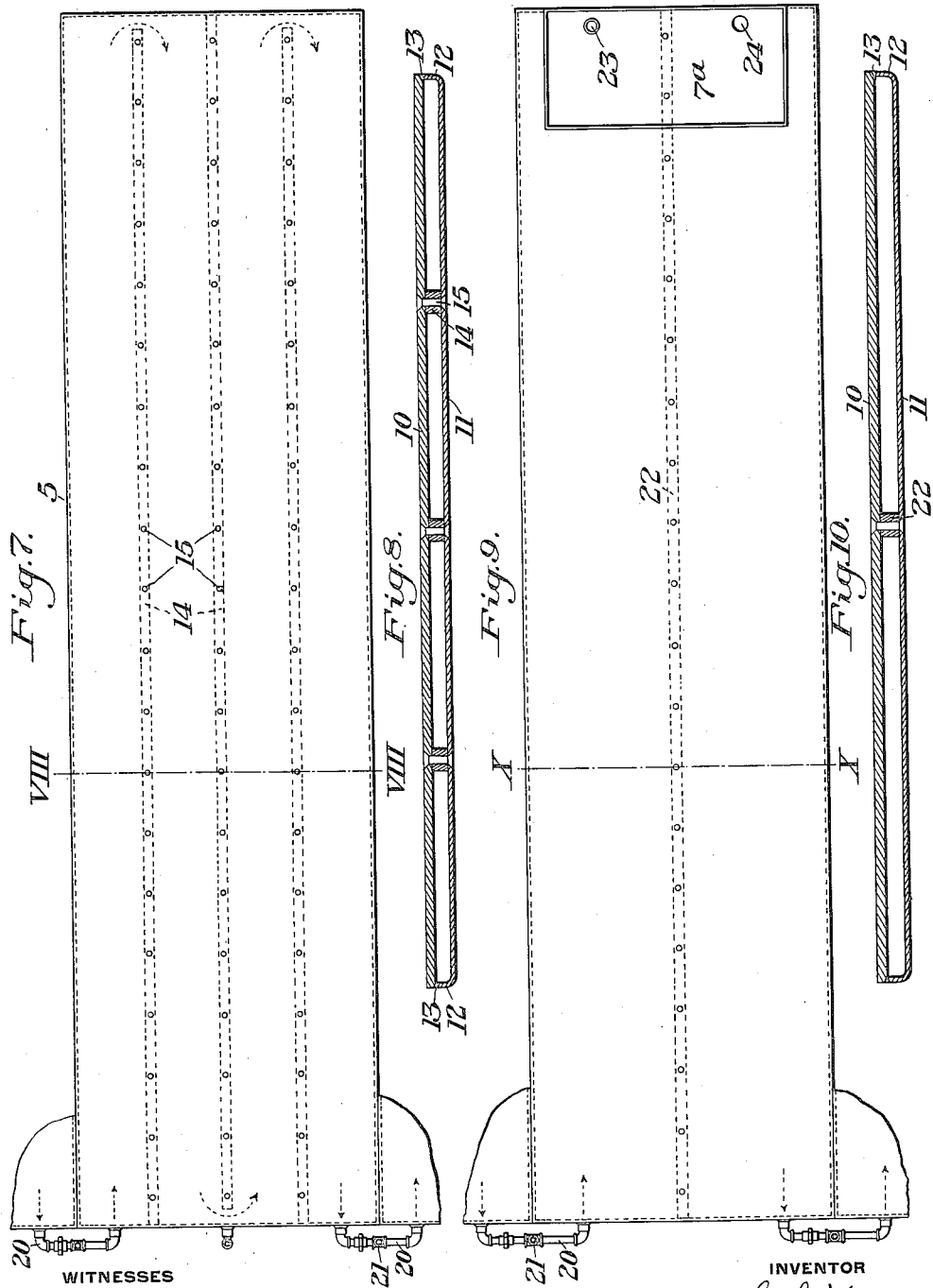

UNITED STATES PATENT OFFICE.

LUTHER L. KNOX, OF AVALON, PENNSYLVANIA.

WATER-COOLED FLOOR.

1,223,800.  Specification of Letters Patent.  Patented Apr. 24, 1917.

Application filed October 24, 1914. Serial No. 868,544.

*To all whom it may concern:*

Be it known that I, LUTHER L. KNOX, a citizen of the United States, residing at Avalon, in the county of Allegheny and State of Pennsylvania, have invented a new and useful Improvement in Water-Cooled Floors, of which the following is a full, clear, and exact description, reference being had to the accompanying drawings, forming part of this specification, in which—

Figure 1 is a view largely diagrammatic and showing one application of my invention, certain of the parts being shown in plan and others in horizontal section.

Fig. 2 is a vertical section of the same.

Fig. 3 is a section on the line III—III of Fig. 2.

Figs. 4 and 5 are detail sectional views taken at substantially right angles to each other through one of the floor units or sections.

Fig. 6 is a plan view partly broken away, showing several of the assembled sections.

Fig. 7 is a plan view, showing a modified form of one of the sections.

Fig. 8 is a section on the line VIII—VIII of Fig. 7.

Figs. 9 and 10 are views which are respectively similar to Figs. 7 and 8, but showing another modification.

My invention has relation to water cooled floors or platforms for use around furnaces, and is designed to provide a floor of this character which will be strong and durable and which can be readily constructed and assembled.

In Fig. 1, I have shown my invention applied between sheet and pair furnaces and adjacent plate mills. In this figure, the numeral 2 designates the sheet and pair furnaces, 3 the bases or foundations for the usual shears and 4 the plate mills. These parts are shown more or less conventionally.

My improved floor is located between the furnaces and the mills and comprises a series of independent hollow water cooled sections or units 5. In building up the floor any desired number of these sections or units can be placed side by side and provided with proper water circulating connections.

6 designates vertically extending water cooled protectors located between the furnaces and the table.

7 designates water boshes, such as are usually employed for cooling the various tools and implements used about the furnaces and mills. These are open boxes or tanks, preferably of sheet metal, and in accordance with my invention they are preferably welded or otherwise secured to the hollow floor section or unit upon which they are supported, the top plate of said section forming the bottom of the tank. This top plate is preferably provided with two or more openings 8 so that water may rise from the section into the bosh to keep it supplied. Each of the sections or units is also preferably provided with one or more vent pipes 9 for the purpose of permitting the escape of any steam which may be formed in the section. These vent pipes are preferably carried to a height greater than that of the bosh, as shown in Fig. 2.

The hollow sections or units forming the floor may be constructed in a variety of ways. In the construction shown in Figs. 1 to 6, inclusive, each section consists of a continuous top plate 10 and bottom plate 11, the latter having its edge portions turned upwardly, as indicated at 12, and welded to the top plate, as indicated at 13. Each section or unit is also shown as having a plurality of internal spacing and reinforcing strips 14 extending longitudinally of the section and secured by rivets 15. These strips not only act as spacers and reinforcements for the floor sections, but they also form baffles whereby an effective water circulation may be maintained within the sections. For this purpose, alternate baffles may be arranged to terminate short of adjacent ends of the sections, as indicated in Fig. 1, to form water circulating passages at these points. A continuous circulation may be carried through all the sections of a floor in series, if desired, by providing one of the sections at one side of the table with an inlet connection 16 and the end section at the opposite side of the table with an outlet connection 17, adjacent sections being provided with circulating connections 18. These connections 18 may be made within the ends of the table, as shown in Figs. 1 and 6, by providing adjacent sections with the recessed corner portions 19, or they may be entirely outside of the table, as indicated at 20 in Figs. 7 and 9. In this case these connections may be provided with the steam vents 21.

Fig. 9 shows a modification in which only one of the internal spacing and baffle strips 22 is provided. In this figure I have also shown the water bosh 7ª as having an upwardly extending water inlet pipe 23 communicating with the interior of the section, and with an outlet opening 24 back into the section.

These different other constructions are illustrative only, it being obvious that sections may be constructed in various ways.

The advantages of my invention consist in the provision of a hollow water cooled floor which can be readily constructed and assembled, which will be strong and durable and in which provision is made for an effective circulation of a cooling liquid.

If desired, the sections can be laid directly upon concrete or other material, as indicated in Fig. 2.

I claim:

1. A water cooled floor, comprising a plurality of hollow metal units arranged side by side, each of said units having a recessed portion at one end thereof and at the edge adjacent to another member, and water circulating connections within said recess connecting adjacent units to each other; substantially as described.

2. A water cooled floor, comprising a plurality of hollow metal units arranged side by side and having water circulating connections between them, and a water bosh secured to the top of one of said units and forming a part thereof, said water bosh having water circulating connections with the unit to which it is secured, substantially as described.

3. A water cooled floor, comprising a plurality of hollow units placed side by side, water circulating connections between said units, each of said units having an upwardly extending relief pipe connected thereto, substantially as described.

4. A water cooled floor, comprising a plurality of hollow metal units arranged side by side and having water circulating connections between them, and a water bosh resting on said floor and having circulating connections with the interior thereof, said floor forming the bottom of the bosh; substantially as described.

5. The combination of a heating furnace and a cooling device comprising a floor having a water chamber therein, means for circulating water through said floor chamber, an upwardly extending water cooled device adjacent to the furnace, and means for circulating water through said device, substantially as described.

In testimony whereof, I have hereunto set my hand.

LUTHER L. KNOX.

Witnesses:
H. M. CORWIN,
GEO. H. PARMELEE.